United States Patent
Fujii et al.

(10) Patent No.: US 11,965,591 B2
(45) Date of Patent: Apr. 23, 2024

(54) LUBRICATION DEVICE FOR HELICOPTER

(71) Applicant: KAWASAKI JUKOGYO KABUSHIKI KAISHA, Kobe (JP)

(72) Inventors: Isao Fujii, Akashi (JP); Yuji Yamazaki, Akashi (JP); Masatoshi Matsumoto, Kobe (JP); Kenta Ogasawara, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 17/824,579

(22) Filed: May 25, 2022

(65) Prior Publication Data

US 2022/0282782 A1 Sep. 8, 2022

Related U.S. Application Data

(60) Division of application No. 16/722,373, filed on Dec. 20, 2019, now Pat. No. 11,365,800, which is a continuation of application No. PCT/JP2018/024131, filed on Jun. 26, 2018.

(30) Foreign Application Priority Data

Jun. 27, 2017 (JP) ................ 2017-124891

(51) Int. Cl.
   *F16H 57/04* (2010.01)
   *B64C 27/12* (2006.01)

(52) U.S. Cl.
   CPC ......... *F16H 57/0442* (2013.01); *B64C 27/12* (2013.01); *F16H 57/045* (2013.01); *F16H 57/0465* (2013.01)

(58) Field of Classification Search
   CPC ............................ F16H 57/0442; F16H 57/45
   See application file for complete search history.

(56) References Cited

U.S. PATENT DOCUMENTS

| | | | | |
|---|---|---|---|---|
| 3,738,452 A | * | 6/1973 | Hausinger | ........... F16H 57/0421 184/6.12 |
| 4,658,665 A | | 4/1987 | Strinzel et al. | |
| 4,721,185 A | * | 1/1988 | Weigle | .................... B60R 16/08 184/6.12 |
| 4,922,765 A | * | 5/1990 | Hayakawa | ........... B60K 17/344 184/6.12 |
| 4,976,335 A | * | 12/1990 | Cappellato | .............. F16N 29/02 184/7.4 |
| 5,121,815 A | | 6/1992 | Francois et al. | |
| 5,662,188 A | | 9/1997 | Ito et al. | |

(Continued)

FOREIGN PATENT DOCUMENTS

JP 2007-008461 A 1/2007

*Primary Examiner* — Minh Truong
(74) *Attorney, Agent, or Firm* — Sughrue Mion, PLLC

(57) ABSTRACT

A lubrication device for a helicopter including: an oil sump in which oil for lubrication is retained; a lubrication pump configured to suck the oil from the oil sump to discharge the oil; and a lubrication passage extending from the lubrication pump to a first lubrication target. The lubrication passage includes: a first supply port that supplies the oil to the first lubrication target; an oil reservoir provided upstream of the first supply port; and an opening provided upstream of the oil reservoir and above the oil reservoir. The first supply port is formed right above the first lubrication target.

6 Claims, 3 Drawing Sheets

(56) References Cited

U.S. PATENT DOCUMENTS

| | | | |
|---|---|---|---|
| 7,651,049 B2 | 1/2010 | Carnelli et al. | |
| 8,646,313 B2 * | 2/2014 | Gale | F04D 15/0066 |
| | | | 324/537 |
| 9,970,527 B2 * | 5/2018 | Smith | F16H 57/0436 |
| 10,012,305 B2 * | 7/2018 | Louis | F16H 57/0442 |
| 11,054,018 B2 * | 7/2021 | Hori | F16H 57/0434 |
| 2007/0261922 A1 | 11/2007 | Mullen et al. | |
| 2009/0071753 A1 | 3/2009 | Carnelli et al. | |
| 2011/0150655 A1 | 6/2011 | Tietze et al. | |
| 2012/0227820 A1 | 9/2012 | Poster | |
| 2015/0285368 A1 * | 10/2015 | Mclauchlan | F16H 57/046 |
| | | | 184/6.12 |
| 2016/0376949 A1 | 12/2016 | Parnin | |
| 2018/0363762 A1 | 12/2018 | Kiyokami et al. | |
| 2019/0063677 A1 | 2/2019 | Poster | |

\* cited by examiner

LUBRICATION DEVICE FOR HELICOPTER

CROSS REFERENCE TO THE RELATED APPLICATION

This application is a divisional application of U.S. application Ser. No. 16/722,373 filed Dec. 20, 2019, which is a continuation application, under 35 U.S.C. § 111(a) of international patent application No. PCT/JP2018/024131, filed Jun. 26, 2018, which claims priority to Japanese patent application No. 2017-124891, filed Jun. 27, 2017, the entire disclosures of all of which are herein incorporated by reference as a part of this application.

BACKGROUND OF THE INVENTION

Field of the Invention

The present invention relates to a lubrication device for a helicopter.

Description of Related Art

Transmission devices for helicopters require a dry-run capability that allows the helicopters to operate even in a state where oil supply is interrupted. Although current technology ensures a necessary dry-run capability, further enhancement in the dry-run capability is desired because of recent trends, such as increasing occasions of over water flights. Current measure against dry running has been known in which emergency oil is reserved for continuing the supply in case of emergency (for example, Patent Document 1).

RELATED DOCUMENT

Patent Document

[Patent Document 1] JP Laid-open Patent Publication No. 2007-008461

In Patent Document 1, a lubrication device includes a main lubrication system for normal time and an auxiliary lubrication system for dry-run time. The auxiliary lubrication system receives oil distributed from the main lubrication system to reserve the oil in a tank during normal time, and discharges the oil by a small amount from the tank during dry-run time. If, however, the lubrication system is configured as a duplex system as in Patent Document 1, the structure becomes complicated.

SUMMARY OF THE INVENTION

Accordingly, an object of the present invention is to provide a lubrication device in which a dry-run capability can be enhanced by a simple configuration.

In order to achieve the above object, a lubrication device according to the present invention includes: an oil sump in which oil for lubrication is retained; a lubrication pump configured to suck the oil from the oil sump to discharge the oil; and a lubrication passage extending from the lubrication pump to a first lubrication target. The lubrication passage includes: a first supply port formed right above the first lubrication target and configured to supply the oil within the lubrication passage to the first lubrication target; an oil reservoir provided upstream of the first supply port with respect to a flow direction of the oil; and an opening provided upstream of an outlet of the oil reservoir and above the outlet of the oil reservoir.

According to this configuration, during normal time, the oil within the lubrication passage is supplied to the first lubrication target from the first supply port via the oil reservoir. Also, a predetermined amount of the oil is retained in the oil reservoir during normal time. When a failure, such as oil leak from a connector included in the lubrication passage, causes decrease in a hydraulic pressure in the lubrication passage to bring the device to a dry-run state, i.e., when the hydraulic pressure in the lubrication passage is decreased to a hydraulic pressure in the oil sump, air is taken into the lubrication passage through the opening. Then, the oil downstream of the opening in the lubrication passage, including the oil in the oil reservoir, is dripped through the first supply port to the first lubrication target, which is located right below, under the influence of gravity. At such a time, the hydraulic pressure in the oil reservoir is maintained at the same pressure as a sump pressure in the lubrication device through the opening, whereby stable dripping lubrication is achieved. Thus, this configuration allows the common oil reservoir to be used for the oil lubrication during normal time as well as the dripping lubrication during dry-run time. Therefore, the dry-run capability can be enhanced by a simple configuration.

In the present invention, the lubrication device may further include a casing accommodating at least the oil sump, the lubrication pump, the first lubrication target and the oil reservoir, and the opening may be defined in an inner space of the casing. According to this configuration, during normal time, the oil can be supplied through the opening to another lubrication target disposed in the inner space of the casing.

In the present invention, the lubrication passage may further include an oil cooler disposed outside the casing and configured to cool the oil in the lubrication passage, and the opening may be provided downstream of the oil cooler in the lubrication passage. According to this configuration, even when oil leak occurs from the oil cooler or a connection part of the oil cooler, the oil is dripped through the first supply port to the first lubrication target that is located right below. Thus, the dry-run capability can be enhanced.

In the present invention, the lubrication passage may further include a second supply port provided upstream of the oil reservoir and configured to supply the oil in the lubrication passage to a second lubrication target. In such a case, the first lubrication target and the second lubrication target may be rotating members of a transmission, and the first lubrication target may rotate at a higher speed than that of the second lubrication target. This configuration makes it possible to concentratedly lubricate, in particular, a high-speed rotating member that has a high lubrication demand during dry-run time.

In the present invention, the opening may be provided upstream of the oil reservoir in the lubrication passage and above the oil reservoir. According to this configuration, the oil located upstream of the oil reservoir and downstream of the opening can also be used for dripping lubrication during dry-run time. In such a case, the opening may be provided between the second supply port and the oil reservoir. According to this configuration, a part of lower lubrication priority can be made the second lubrication target, whereby the first lubrication target of high lubrication priority is effectively lubricated during dry-run time.

In the present invention, the opening may be provided in the oil reservoir. In such a case, the opening may be provided in an upper wall of the oil reservoir. This configuration makes it possible to effectively discharge the air within the oil reservoir through the opening when starting the lubrication device.

In the present invention, the lubrication device may further include: an auxiliary oil sump that reserves backup oil; an auxiliary lubrication pump configured to suck the oil from the auxiliary oil sump to discharge the oil; and an auxiliary lubrication passage connecting the auxiliary lubrication pump and the oil reservoir. According to this configuration, provision of the auxiliary oil sump makes it possible to increase an amount of oil circulation during dry-run time.

Where the auxiliary lubrication passage is provided, when a hydraulic pressure in the lubrication passage is higher than a hydraulic pressure in the oil sump, i.e. during normal time, the hydraulic pressure in the lubrication passage may be higher than a hydraulic pressure in the auxiliary lubrication passage. According to this configuration, since the connection port of the auxiliary lubrication passage to the oil reservoir is closed due to the hydraulic pressure in the lubrication passage during normal time, the auxiliary lubrication passage does not function. Thus, an oil filter does not have to be provided in the auxiliary lubrication passage because the oil does not flow into the auxiliary lubrication passage during normal time.

Where the auxiliary oil sump is provided, the auxiliary oil sump may be a recess formed at a bottom part of the oil sump, a suction port of the lubrication pump may be located above the recess in the oil sump, and a suction port of the auxiliary lubrication pump may be located in the recess. According to this configuration, the auxiliary oil sump is configured as a recess formed at the bottom part of the oil sump, thereby making the lubrication device compact.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE EMBODIMENTS

Hereinafter, preferred embodiments of the present invention will be described with reference to the drawings. In the following description, the term "normal time" refers to a period of time when a helicopter operates in a state where lubrication oil is normally supplied and circulated in a transmission device (transmission) of the helicopter. The term "dry-run time" refers to a period of time when a helicopter operates in a failure state, such as an oil leak, state where lubrication oil contained in a transmission device of the helicopter is leaking.

Figure 1:
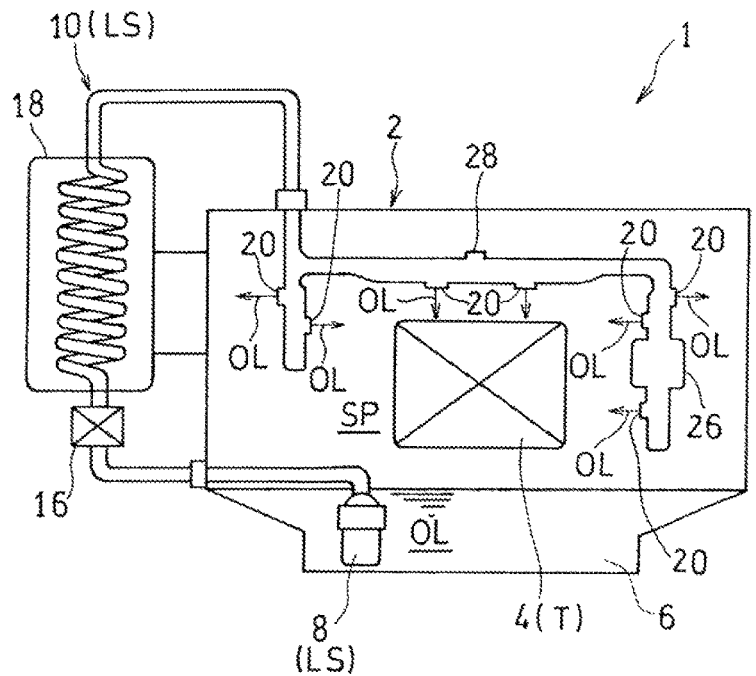
FIG. 1 is a system diagram of a lubrication system of a lubrication device according to a first embodiment of the present invention.

FIG. 1 shows a lubrication system diagram of a transmission device for a helicopter, the transmission device including a lubrication device LS according to a first embodiment of the present invention. The transmission 1 includes a transmission gear 4. The transmission gear 4 constitutes a rotating member of the transmission 1. The transmission gear 4 is configured to change a speed of rotation of an engine (not illustrated) to transmit the rotation to a main rotor (not illustrated) and a tail rotor (not illustrated).

Figure 2:
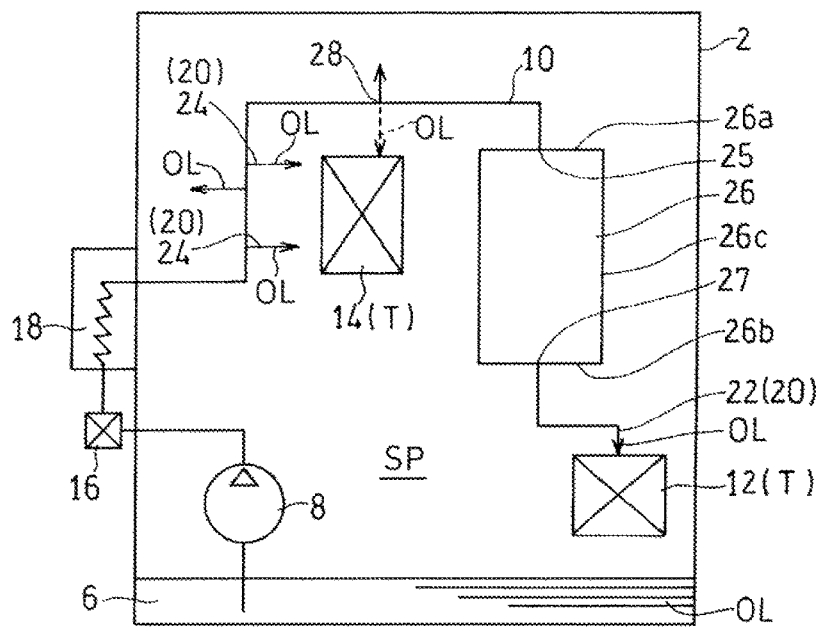
FIG. 2 is a simplified system diagram of the lubrication system of the same lubrication device.

A lubrication target T of the lubrication device LS in this embodiment is a rotating member of the transmission 1 for a helicopter. Specifically, the lubrication target T is the transmission gear 4 or a bearing part of a rotation shaft to which a gear is provided. In particular, where the lubrication target T is the transmission gear 4, oil OL is preferably supplied to an engagement part of the gear. The lubrication target T includes a first lubrication target 12 (FIG. 2) and a second lubrication target 14 (FIG. 2). It should be noted that the number of the lubrication target T is not limited to this. For example, the second lubrication target 14 may be omitted. Alternatively, the number of the lubrication target T may be 3 or more. In the present embodiment, the first lubrication target 12 rotates at a higher speed than that of the second lubrication target 14. In particular, the first lubrication target 12 is preferably a part of the transmission gear 4 which rotates at highest speed. For example, the first lubrication target 12 preferably includes a gear to which rotation of an engine (not illustrated) is inputted and a bearing for the gear.

The lubrication device LS supplies the oil OL for lubrication to the lubrication target T. The lubrication device LS includes an oil sump 6, a lubrication pump 8, and a lubrication passage 10. The lubrication device LS also includes a casing 2 accommodating the lubrication target T, an oil reservoir 26 and at least a part of the lubrication passage 10.

The oil sump 6 retains the oil OL. In the present embodiment, the oil sump 6 is formed in a lower part of the casing 2. Specifically, the oil sump 6 is formed by a part (central part) of a bottom wall of the casing 2, which part is recessed downward. In the present embodiment, the oil sump 6 is integrally formed with the casing 2. The oil sump 6, however, is not limited to this configuration. For example, the oil sump 6 may be formed as a recess provided in a part of a side wall of the casing 2.

The lubrication pump 8 sucks the oil OL from the oil sump 6 to discharge the oil. The lubrication pump 8 is disposed within the oil sump 6. However, the lubrication pump 8 as a whole is not necessarily provided within the oil sump 6, as long as a suction port of the pump or a conduit connected to the suction port is disposed within the oil sump 6. The lubrication pump 8 is not particularly limited to and may be, for example, a gear pump. The oil OL discharged from the lubrication pump 8 passes through the lubrication passage 10 to be supplied to the lubrication target T.

The lubrication passage 10 is a passage for the oil OL which extends from the lubrication pump 8 to the first lubrication target 12. The lubrication passage 10 is provided with various devices therealong. The lubrication passage 10 is mainly constituted of conduits. The lubrication passage 10 includes supply ports 20, an oil reservoir 26 and an opening 28. In the present embodiment, the lubrication passage 10 further includes an oil filter 16 and an oil cooler 18. The oil filter 16 is disposed downstream of the lubrication pump 8 to filter the oil OL. The oil cooler 18 is disposed downstream of the oil filter 16 to cool the oil OL. The oil filter 16 and/or the oil cooler 18 may be omitted in accordance with use condition.

In the present embodiment, the oil filter 16 and the oil cooler 18 are disposed outside the casing 2. Specifically, a part of the lubrication passage 10 extending from the lubrication pump 8 penetrates a wall of the casing 2 to extend outside the casing 2. The oil filter 16 and the oil cooler 18 are provided in the part of the lubrication passage 10, which part extends outside the casing 2. The lubrication passage 10 extends outside the casing 2, penetrates a wall of the casing 2 and enters the casing 2 so as to supply the oil OL to the lubrication target T.

FIG. 2 shows the lubrication system of FIG. 1 in a simplified manner. The supply ports 20 supply the oil OL to the lubrication target T. The supply ports 20 are formed in an inner space SP of the casing 2. In the present embodiment, the supply ports 20 include a first supply port 22 for supplying the oil OL to the first lubrication target 12 and a second supply port 24 for supplying the oil OL to the second lubrication target 14. It should be noted that the number of the supply ports 20 is not limited to this. For example, where the second lubrication target 14 is omitted, the second supply port 24 may also be omitted. Alternatively, where the number of the lubrication target T is 3 or more, there may be 3 or more supply ports 20. The first and second supply ports 22, 24 are oil injection nozzles. The first and second supply ports 22, 24, however, are not limited to this form. For example, the first and second supply ports 22, 24 may be through-holes defined in conduit walls of the conduits constituting the lubrication passage 10.

The first supply port 22 is provided right above the first lubrication target 12. The expression "provided right above" used herein means that the first supply port 22 is provided above the first lubrication target 12 and within a range where the oil OL dripped from the first supply port 22 under the influence of gravity during dry-run time reaches the first lubrication target 12. That is, the expression "right above" includes horizontal deviation in the range where the oil OL dripped by gravity reaches the first lubrication target 12. Thus, the first supply port 22 is configured to drip the oil OL to the first lubrication target 12 during dry-run time.

The oil reservoir 26 is disposed upstream of the first supply port 22 with respect to a flow direction of the oil OL in the lubrication passage 10. Specifically, the oil reservoir 26 is disposed upstream of the first supply port 22 and downstream of the second supply port 24 in the lubrication passage 10. During normal time, the oil reservoir 26 retains the oil OL thereinside. During dry-run time, the oil OL retained in the oil reservoir 26 is dripped to the first lubrication target 12 through the first supply port 22. The volume of the oil reservoir 26 may be suitably selected in accordance with a required dry-run capability. In the present embodiment, the oil reservoir 26 is configured as a box-like tank. The oil reservoir, however, is not limited to this configuration. For example, the oil reservoir 26 may be formed by increasing the diameter of the conduit(s) constituting the lubrication passage 10. Thus, the oil reservoir 26 has a larger passage area (cross-sectional area) than those of the conduits located upstream and downstream of the oil reservoir, and has a greater amount of the oil OL storage per a unit length (the same length) than those of the conduits located upstream and downstream of the oil reservoir. Alternatively, the oil reservoir 26 may be integrally provided with a side wall or an upper wall of the casing 2.

In the present embodiment, the box-like oil reservoir 26 is formed with an inlet 25 in an upper wall 26a thereof and with an outlet 27 in a lower wall 26b thereof. That is, the lubrication passage 10 leading to the opening 28 is connected to the upper wall 26a of the oil reservoir 26, and the lubrication passage 10 leading to the first supply port 22 is connected to the lower wall 26b of the oil reservoir 26. The oil reservoir, however, is not limited to this configuration. For example, the outlet 27 of the oil reservoir 26 may be provided in a lower portion of a side wall 26c, instead of the lower wall 26b.

The opening 28 is provided upstream of the outlet 27 of the oil reservoir 26 and above the outlet 27 of the oil reservoir 26 in the lubrication passage 10. In the present embodiment, the opening 28 is provided upstream of the oil reservoir 26 and above the oil reservoir 26 in the lubrication passage 10. As long as the opening 28 is located above the outlet 27 of the oil reservoir 26, the opening 28 may be provided in the oil reservoir 26 per se. Even where the opening 28 is provided upstream of the oil reservoir 26 in the lubrication passage 10, as in this embodiment, the opening 28 is not necessarily located right above the oil reservoir 26. That is, the expression "above" used herein means above (i.e. at a higher location) in the vertical direction, and the oil reservoir 26 and the opening 28 may be offset from each other in the horizontal direction. The opening 28 is formed in the inner space SP of the casing 2. In the present embodiment, the opening 28 is provided downstream of the oil cooler 18 and between the second supply port 24 and the oil reservoir 26.

The opening 28 is configured to inject the oil OL during normal time. Therefore, when the lubrication target T is disposed downstream of the opening 28, the lubrication target T is lubricated during normal time. On the other hand, the opening 28 is configured such that, when a hydraulic pressure in the lubrication passage 10 is decreased, specifically, when the hydraulic pressure in the lubrication passage 10 is decreased to a pressure in the oil sump 6 (inner space SP), air is taken into the lubrication passage 10 through the opening 28. In the present embodiment, the opening 28 is a through hole provided in a conduit constituting the lubrication passage 10. The opening 28, however, is not limited to this configuration. For example, the opening 28 may be a projected nozzle hole provided in the conduit. Where the opening 28 is configured as a nozzle, a part of the oil can be precisely supplied to the lubrication target T from the opening 28 during normal time.

More specifically, the opening 28 is provided at least above the outlet 27 of the oil reservoir 26 and above the first supply port 22. The opening 28 is preferably provided in a topside (upper wall 26a) of the oil reservoir 26 or above the topside of the oil reservoir 26. Thus, all the oil OL retained in the oil reservoir 26 can be supplied to the first lubrication target 12 during dry-run time. The lubrication passage 10 between the opening 28 and the oil reservoir 26 may be partially located above the opening 28. In such a case, however, a part of the oil OL, which part is located above the opening 28, in the lubrication passage 10 moves reversely and flows out from the opening 28 during dry-run time. Therefore, the lubrication passage 10 between the opening 28 and the oil reservoir 26 is preferably provided below the opening 28.

The first supply port 22 is provided at least below the topside (upper wall 26a) of the oil reservoir 26 and below the opening 28. If, however, the first supply port 22 is provided above an underside (lower wall 26b) of the oil reservoir 26, the first OL that is retained below the first supply port 22 in the oil reservoir 26 is not supplied to the first lubrication target 12 during dry-run time. Therefore, the first supply port 22 is preferably provided below the underside (lower wall 26b) of the oil reservoir 26. For the above reasons, the opening 28 is preferably provided in the topside of the oil reservoir 26 or above the topside of the oil reservoir 26, and the first supply port 22 is preferably provided below the underside of the oil reservoir 26. Thus, all the oil OL in the oil reservoir 26 can be supplied to the first lubrication target 12 during dry-run time.

Figure 3:
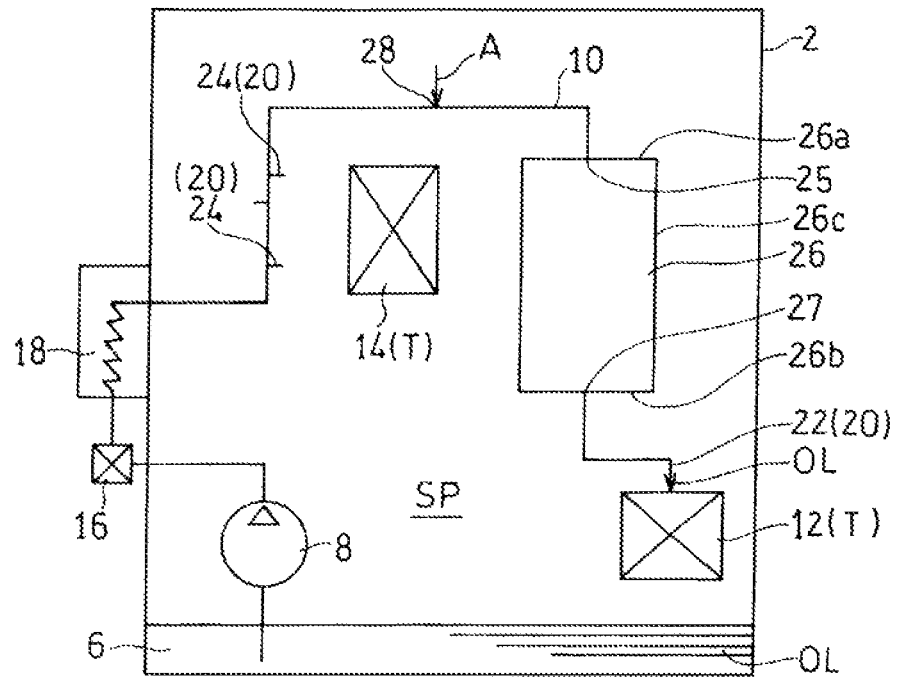
FIG. 3 is a simplified system diagram showing the same lubrication system in a dry-run state.

Referring to FIG. 2 and FIG. 3, the operation of the lubrication device LS in this embodiment will be described. FIG. 2 shows flow of the oil OL during normal time, and FIG. 3 shows flow of the oil OL during dry-run time. During the normal time as shown in FIG. 2, the oil OL in the oil sump 6 is sucked and discharged by the lubrication pump 8. The oil OL discharged from the lubrication pump 8 passes through the lubrication passage 10 to be supplied to the lubrication target T.

The flow of the oil OL during normal time in this embodiment will be described in detail. The oil OL discharged by lubrication pump 8 is filtered by the oil filter 16 outside the casing 2, and then, is cooled by the oil cooler 18. The oil OL cooled by the oil cooler 18 is returned into the casing 2, and a part of the oil is supplied to the second lubrication target 14 from the second supply port 24. During normal time, the oil OL is injected from the second supply port 24 under the hydraulic pressure in the lubrication passage 10.

The oil OL further flows within the lubrication passage 10, and a part of the oil is injected from the opening 28 into the inner space SP of the casing 2. The rest of the oil OL further flows within the lubrication passage 10 to reach the oil reservoir 26. A predetermined amount of the oil OL is retained in the oil reservoir 26. The oil OL having passed the oil reservoir 26 is supplied to the first lubrication target 12 from the first supply port 22. During normal time, the oil OL is injected from the first supply port 22 under the hydraulic pressure in the lubrication passage 10. The oil OL supplied from the first and second supply ports 22, 24 and the oil OL injected from the opening 28 lubricate the first lubrication target 12 and the second lubrication target 14, and then are collected in the oil sump 6.

In dry-run time due to e.g. oil leak, as shown in FIG. 3, the oil supply is stopped. Then, the hydraulic pressure P1 in the lubrication passage 10 is decreased. When the hydraulic pressure P1 in the lubrication passage 10 is decreased to a pressure P2 in the oil sump 6 (inner space SP), air A is taken into the lubrication passage 10 through the opening 28. Thus, the oil OL downstream of the opening 28 in the lubrication passage 10 flows into the oil reservoir 26 under the influence of gravity. The oil OL in the oil reservoir 26 is then dripped from the first supply port 22 to the first lubrication target 12 under the influence of gravity. Since the hydraulic pressure P3 in the oil reservoir 26 is maintained at the same pressure as the pressure P2 in the oil sump 6 (inner space SP) through the opening 28, stable dripping lubrication is achieved. At this point, since the oil OL upstream of the opening 28 in the lubrication passage 10 has a decreased pressure, the oil supply from the second supply port 24 to the second lubrication target 14 is stopped.

According to the above configuration, during the normal time as in FIG. 2, the oil OL in the lubrication passage 10 is supplied to the first lubrication target 12 from the first supply port 22 through the oil reservoir 26. During normal time, a predetermined amount of the oil OL is retained in the oil reservoir 26. During the dry-run time as in FIG. 3, air A is taken into the lubrication passage 10 through the opening 28. Then, the oil OL in the oil reservoir 26 as well as the oil OL between the opening 28 and the oil reservoir 26 in the lubrication passage 10 are dripped to the first lubrication target 12 from the first supply port 22 under the influence of gravity. Thus, the common oil reservoir 26 can be used for the oil lubrication during normal time as well as dripping lubrication during dry-run time. Therefore, the dry-run capability can be enhanced by a simple configuration.

The oil sump 6, the lubrication pump 8, the lubrication target T and the oil reservoir 26 are accommodated in the casing 2, and the opening 28 is defined in the inner space SP of the casing 2. Thus, during the normal time as in FIG. 2, the oil OL injected from the opening 28 can be supplied to the lubrication target T disposed in the inner space SP of the casing 2.

The opening 28 of the lubrication passage 10 is provided downstream of the oil cooler 18 disposed outside the casing 2. This makes it possible to supply the oil OL, after cooling by oil cooler 18, to the first lubrication target 12 and to supply the oil OL after cooling to the second lubrication target 14 from a location between the oil cooler 18 and the oil reservoir 26 in the lubrication passage 10, during normal time.

The second supply port 24 for supplying the oil OL to the second lubrication target 14 is provided upstream of the oil reservoir 26 in the lubrication passage 10, and the opening 28 is provided between the second supply port 24 and the oil reservoir 26. This makes it possible to effectively lubricate the first lubrication target 12 of high lubrication priority, during dry-run time.

The first lubrication target 12 and the second lubrication target 14 are rotating members of the transmission, and a high-speed rotating member that rotates at a higher speed than that of the second lubrication target 14 is made the first lubrication target 12. This makes it possible to concentratedly lubricate, in particular, the high-speed rotating member of high lubrication priority during dry-run time.

Figure 4:
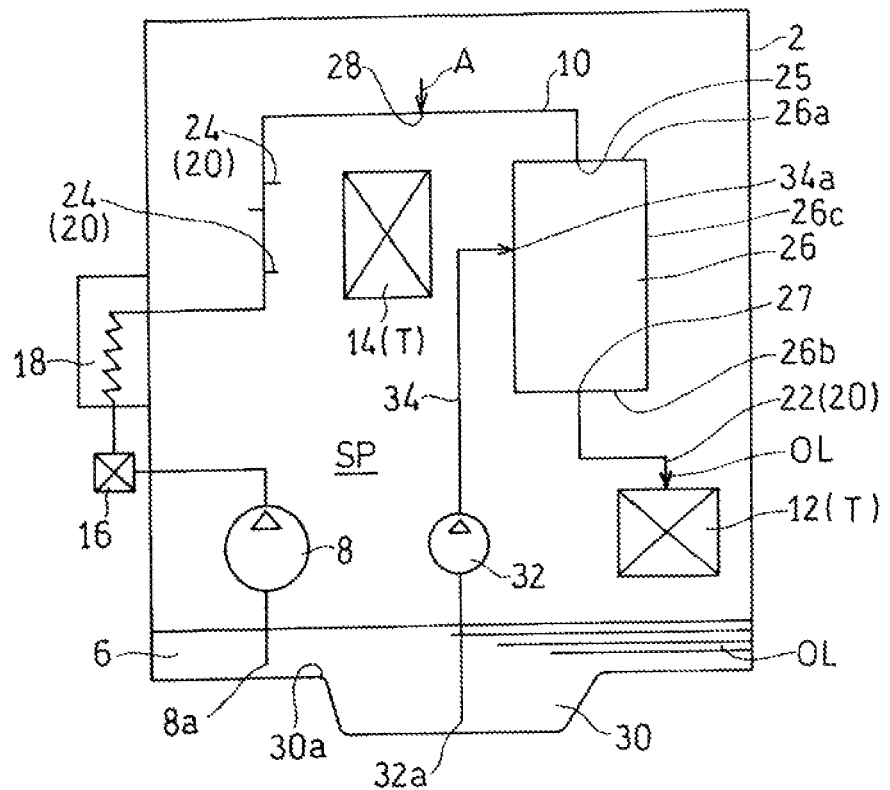
FIG. 4 is a system diagram of a lubrication system of a lubrication device according to a second embodiment of the present invention.

FIG. 4 is a system diagram of a lubrication system of a lubrication device according to a second embodiment of the present invention in a simplified manner. The lubrication device LS of the second embodiment differs from the first embodiment in that the lubrication device LS includes an auxiliary oil sump 30, an auxiliary lubrication pump 32 and an auxiliary lubrication passage 34.

The auxiliary oil sump 30 reserves backup oil OL. The backup oil OL is supplied to the lubrication target T during dry-run time. The auxiliary oil sump 30 of this embodiment is formed below a bottom part of the oil sump 6. Specifically, the auxiliary oil sump 30 is configured as a recess formed in the bottom part of the oil sump 6. The auxiliary oil sump 30, however, is not limited to this configuration. A suction port 8a of the lubrication pump 8 is located above an upper edge 30a of the recess 30 in the oil sump 6 (at the same height with the underside of the oil sump 6).

The auxiliary lubrication pump 32 sucks and discharges the oil OL from the auxiliary oil sump 30. The suction port 32a of the auxiliary lubrication pump 32 is located blow the upper edge 30a of the recess 30, i.e., within the recess 30. Therefore, the upper edge 30a of the recess 30 is located above the suction port 32a of the auxiliary lubrication pump 32. The terms "above" and "below" used herein refer to an upper location and a lower location in the vertical direction, respectively, regardless of horizontal locations. The auxiliary lubrication pump 32 may be a centrifugal pump in order to suppress an increase in a hydraulic pressure P4 in the auxiliary lubrication passage 34.

The auxiliary lubrication passage 34 connects the auxiliary lubrication pump 32 and the oil reservoir 26. The auxiliary lubrication passage 34 has a connection port 34a, which is connected with the oil reservoir 26. In the second embodiment, no oil filter is provided in the auxiliary lubrication passage 34. The hydraulic pressure P1 in the lubrication passage 10 during normal time is set to be higher than the hydraulic pressure P4 in the auxiliary lubrication passage 34. Also, the hydraulic pressure P4 in the auxiliary lubrication passage 34 is set to be higher than the pressure P2 in the oil sump 6 (inner space SP). There may be a relief valve in the auxiliary lubrication passage 34 in order to suppress an increase in the hydraulic pressure P4 in the auxiliary lubrication passage 34. Other features of this embodiment are the same as those of the first embodiment.

The operation of the lubrication device in the second embodiment will be described. During normal time, the hydraulic pressure P1 in the lubrication passage 10 is higher than the pressure P2 in the oil sump 6 (inner space SP), and higher than the hydraulic pressure P4 in the auxiliary lubrication passage 34. That is, the lubrication pump 8 has a higher discharge pressure than a discharge pressure of the auxiliary lubrication pump 32. Thus, during normal time, the connection port 34a from the auxiliary lubrication passage 34 to the oil reservoir 26 is closed under the hydraulic pressure P1 in the lubrication passage 10, thereby preventing the oil supply to the oil reservoir 26. Therefore, the flow of the oil OL during normal time is the same as that of the above-described first embodiment.

During dry-run time, as in the above-described first embodiment, when the hydraulic pressure P1 in the lubrication passage 10 is decreased to the pressure P2 in the oil sump 6 (inner space SP), air A is taken into the lubrication passage 10 through the opening 28, and the oil OL in the oil reservoir 26 is dripped to the first lubrication target 12. At such a time, the hydraulic pressure P3 in the oil reservoir 26 is maintained at the same pressure as the pressure P2 in the oil sump 6 (inner space SP) through the opening 28. That is, the hydraulic pressure P4 in the auxiliary lubrication passage 34 is higher than the hydraulic pressure P3 in the oil reservoir 26. Accordingly, the oil OL is supplied from the auxiliary lubrication passage 34 to the oil reservoir 26. Thus, the auxiliary lubrication passage 34 is preferably configured to communicate with the oil reservoir 26 only during dry-run time.

According to the second embodiment, since the oil OL is supplied to the oil reservoir 26 from the auxiliary lubrication passage 34 during dry-run time, an amount of oil circulation during dry-run time can be increased. Therefore, the dry-run capability can further be enhanced.

Also, during normal time, the hydraulic pressure P1 in the lubrication passage 10 is set to be higher than the hydraulic pressure P4 in the auxiliary lubrication passage 34. That is, during normal time, the auxiliary lubrication passage 34 does not function because of the hydraulic pressure P1 in the lubrication passage 10. Therefore, an oil filter is not necessary in the auxiliary lubrication passage 34, thereby making it possible to reduce the number of parts. During normal time, the clean oil OL that has passed through an oil filter 16 disposed downstream of the lubrication pump 8 is distributed to the respective parts. Although such an oil filter 16 helps to extend lifetime of a gear and/or a bearing, omitting the oil filter has little influence on the lifetime because the oil supply during dry-run time is performed only for a very short period of time.

The auxiliary oil sump 30 is configured as a recess formed in the bottom part of the oil sump 6, thereby making the lubrication device LS compact. Providing the oil sumps 6, 30 in a stepped configuration having two depths makes it easy to secure the oil OL for dry-run time. Moreover, the auxiliary lubrication pump 32 makes it possible to reuse the oil OL collected during dry-run time.

Figure 5:
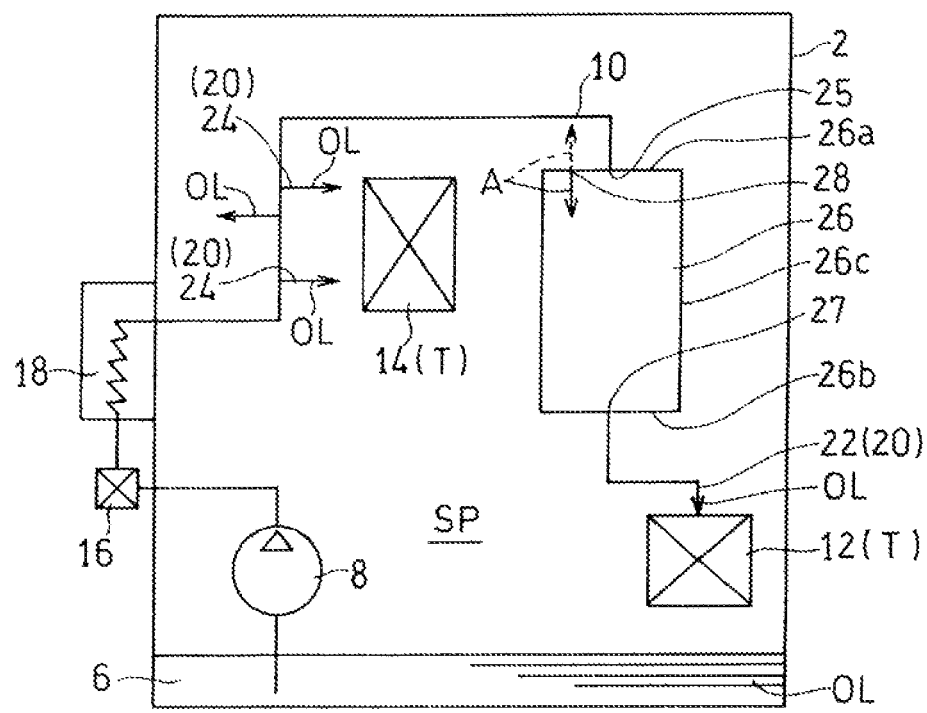
FIG. 5 is a system diagram of a lubrication system of a lubrication device according to a third embodiment of the present invention.

FIG. 5 is a system diagram of a lubrication system of a lubrication device according to a third embodiment of the present invention in a simplified manner. The lubrication device LS of the third embodiment differs in the position of the opening 28 from the first embodiment. Specifically, in the third embodiment, the opening 28 is defined in the topside (upper wall 26a) of the oil reservoir 26. However, the opening 28 may be defined in an upper part of the side wall 26c of the oil reservoir 26, preferably above a position at ⅔ of the height of the oil reservoir 26. Other features of this embodiment are the same as those of the lubrication device LS of the first embodiment.

Also, even in the third embodiment, as in the first embodiment, one or more of the oil filter 16, the oil cooler 18 and the second supply port 24 may be omitted according to circumstances. Further, the lubrication device LS of the third embodiment can be provided with the auxiliary oil sump 30, the auxiliary lubrication pump 32 and the auxiliary lubrication passage 34 of the second embodiment.

During normal time, as in the first embodiment, a predetermined amount of the oil OL is retained in the oil reservoir 26. At such a time, as shown by a broken line in FIG. 5, the air A in the oil reservoir 26 is discharged to the outside of the oil reservoir 26 from the opening 28 of the upper wall 26a. This makes it possible to prevent the air from accumulating inside the oil reservoir 26. As a result, the volume of the oil reservoir 26 can be effectively used. The oil OL having passed the oil reservoir 26 is supplied to the first lubrication target 12 from the first supply port 22.

During dry-run time, as in the above-described first embodiment, when the hydraulic pressure P1 in the lubrication passage 10 is decreased to the pressure P2 of the oil sump 6 (inner space SP), the air A is taken into the oil reservoir 26 through the opening 28, and the oil OL in the oil reservoir 26 is dripped to the first lubrication target 12. Since the hydraulic pressure P3 in the oil reservoir 26 is maintained at the same pressure as the pressure P2 in the oil sump 6 (inner space SP) through the opening 28, stable dripping lubrication is achieved.

The present invention is not limited to the embodiments described above, and various additions, modifications, or deletions may be made without departing from the scope of the invention. For example, the opening 28 is not limited to a through-hole provided in a conduit constituting the lubrication passage 10, and may be a projected nozzle. In such a case, during normal time, the oil OL can be supplied to the lubrication target T from the opening 28. Accordingly, such variants are included within the scope of the present invention.

REFERENCE NUMERALS

1 . . . Transmission
2 . . . Casing
6 . . . Oil sump
8 . . . Lubrication pump
10 . . . Lubrication passage 12 . . . First lubrication target
14 . . . Second lubrication target
18 . . . Oil cooler
22 . . . First supply port
24 . . . Second supply port
25 . . . Inlet of the oil reservoir
26 . . . Oil reservoir
26a . . . Upper wall of the oil reservoir
27 . . . Outlet of the oil reservoir
28 . . . Opening
30 . . . Auxiliary oil sump (recess)
32 . . . Auxiliary lubrication pump
34 . . . Auxiliary lubrication passage
LS . . . Lubrication device
OL . . . Oil
SP . . . Inner space of the casing

What is claimed is:

1. A lubrication device for a helicopter comprising:
an oil sump in which oil for lubrication is retained;
a lubrication pump configured to suck the oil from the oil sump to discharge the oil; and
a lubrication passage extending from the lubrication pump to a first lubrication target,
wherein the lubrication passage includes:
a first supply port formed right above the first lubrication target and configured to supply the oil within the lubrication passage to the first lubrication target;
an oil reservoir provided upstream of the first supply port with respect to a flow direction of the oil;
an opening provided upstream of an outlet of the oil reservoir and above the outlet of the oil reservoir, the opening being provided in the oil reservoir; and
a second supply port provided upstream of the oil reservoir and configured to supply the oil in the lubrication passage to a second lubrication target,
wherein the oil reservoir and the second supply port are arranged in line with respect to each other, and
wherein the second supply port is an oil injection nozzle.

2. The lubrication device for a helicopter as claimed in claim 1, wherein the opening is provided in an upper wall of the oil reservoir.

3. The lubrication device for a helicopter as claimed in claim 1, wherein the opening is provided downstream of the second supply port.

4. The lubrication device for a helicopter as claimed in claim 1, further comprising a casing accommodating at least the oil sump, the lubrication pump, the first lubrication target and the oil reservoir,
wherein the opening is defined in an inner space of the casing.

5. The lubrication device for a helicopter as claimed in claim 4, wherein the lubrication passage further includes an oil cooler disposed outside the casing and configured to cool the oil in the lubrication passage, and
the opening is provided downstream of the oil cooler in the lubrication passage.

6. The lubrication device for a helicopter as claimed in claim 1, the first lubrication target and the second lubrication target are rotating members of a transmission, and
the first lubrication target rotates at a higher speed than that of the second lubrication target.

* * * * *